United States Patent [19]
Norcross

[11] 3,866,290
[45] Feb. 18, 1975

[54] APPARATUS FOR INSERTING FIBERS INTO A SURFACE

[76] Inventor: John L. Norcross, c/o UMC Electropics, Inc., P.O. Box 3118, New Milford, Conn. 06810

[22] Filed: Apr. 23, 1973

[21] Appl. No.: 353,739

[52] U.S. Cl. ...... 29/203 V, 29/DIG. 44, 29/DIG. 46
[51] Int. Cl. .......................................... H05k 13/04
[58] Field of Search ....... 29/203 V, 203 R, DIG. 44, 29/DIG. 46, 211 R, 203 P

[56] References Cited
UNITED STATES PATENTS
2,768,431  10/1956  Hughes .......................... 29/DIG. 46
3,667,103   6/1972  Petree .............................. 29/203 V Primary Examiner—Thomas H. Eager
Attorney, Agent, or Firm—Brumbaugh, Graves, Donohue & Raymond

[57] ABSTRACT

Apparatus for inserting light transmitting fibers into a display panel having formed therein a predetermined pattern of holes includes an open ended hopper for the fibers with means for releasably clamping the display panel to an open end of the hopper. The hopper is mounted onto a movable housing located beneath the hopper and having a depth at least equal to the length of the fibers retained in the storage hopper. A vibrating motor vibrates the housing to thereby move the hopper back and forth and cause the ends of the fibers to move about and into the holes formed in the display panel.

12 Claims, 5 Drawing Figures

APPARATUS FOR INSERTING FIBERS INTO A SURFACE

BACKGROUND OF THE INVENTION

The development of optical fibers has led to their adoption for many purposes, such as for intricate illuminated display devices. One advantage of display devices using optical fibers over conventional display devices using light bulbs is that maintenance of the optical fiber display devices is greatly reduced, especially since there is generally only a single light bulb to be changed periodically. They are also less likely to be damaged during shipping and installation.

In manufacturing a display device using optical fibers, the design of the display is laid out on the front surface of a sheet of metal or plastic, for example. Holes are formed in the surface, arranged to correspond to the design of the display and dispersed according to the degree of illumination required. Optical fibers are inserted into the holes and are drawn through to the reverse side of the sheet until the enlarged lens end of each fiber is seated in its associated hole adjacent the front surface of the sheet. The other ends of the fibers are bundled together behind the sheet. Light is directed at such bundled ends, usually through a rotating color filter wheel or disk. When illuminated, the optical fibers transmit the light to their enlarged ends seated in the front surface of the sheet, illuminating the enlarged fiber ends and, thus, the design of the display.

It is customary to fabricate an optical fiber display by inserting the fibers into the front surface of the display manually, one at a time. Manual insertion of the fibers into the surface is time consuming and is also repetitious and monotonous. Thus, it bores a worker fabricating the display and reduces his efficiency, so that the fabrication takes even more time.

SUMMARY OF THE INVENTION

The present invention is an apparatus for inserting fibers, such as optical fibers, into a surface, such as the front surface of a display, in which there is a multiplicity of holes. The apparatus includes means, such as a hopper, for maintianing the fibers generally upright adjacent to and above the surface, when the surface is generally horizontal. Additional means, such as a vibrator, effects relative movement between the fibers and the surface to move the fibers about the surface. As the fibers move about, they find the holes in the surface and are received in the holes. The present invention thus permits large numbers of fibers to be inserted into a surface in less time and with less effort than would be necessary if the fibers were inserted manually.

In one embodiment of the invention, the fiber maintaining means is a hopper constructed to have an open top and bottom, side walls, and a plurality of transverse partitions dividing the hopper into longitudinal hopper sections. Clamps associated with the hopper releasably couple a surface to the bottom of the hopper. The hopper is pivotally mounted on a stationary supporting frame and can be pivoted relative to the supporting frame until the sides of the hopper are generally horizontal for convenient loading of fibers into the hopper.

The movement-effecting means is a vibrator secured to a housing that is located below the hopper and is resiliently coupled to the supporting frame. The housing defines a chamber having a depth at least equal to the length of the fibers and has an opening in its upper end, whereby the chamber communicates with an underside of the surface when the surface is horizontal and adjacent the housing. The chamber of the housing further communicates with an intake part of a fan that is also located below the hopper. Clamps associated with the upper end of the housing releasably couple the hopper and the surface to the housing when the surface is adjacent the upper end of the housing and coupled to the hopper.

In operation, the hopper is pivoted upwardly relative to the stationary frame, until its sides are generally horizontal, and fibers are loaded through the open top of the hopper into the longitudinal hpper sections. The surface into which the fibers are to be inserted is attached by the hopper clamps to the bottom of the hopper, and the hopper and surface are pivoted downwardly until the surface is generally horizontal and rests on the upper end of the housing. The hopper and surface are then clamped to the housing and the vibrator and fan are activated. The vibrator effects relative movement between the fibers in the hopper and the surface to move the fibers about the surface. In moving about the surface, the fibers find the holes in the surface and are received in the holes. The fan produces suction in the housing chamber below the surface, which, together with gravity, pulls the fibers through the holes in the surface.

As can be seen from the above description, the present invention provides an apparatus for inserting fibers into a surface in a much shorter time than it would take to insert the fibers manually. The apparatus speeds production time and cuts labor costs. By eliminating a tedious and monotonous operation, the apparatus also reduces delays and product defects resulting from worker inattention.

BRIEF DESCRIPTION OF THE DRAWINGS

For a better understanding of the invention, reference may be made to the following description of an exemplary embodiment, taken in conjunction with the figures of the accompanying drawings, in which:

FIG. 1A is an enlarged view of a portion of the apparatus of FIG. 1;

DESCRIPTION OF AN EMBODIMENT

Figure 1:
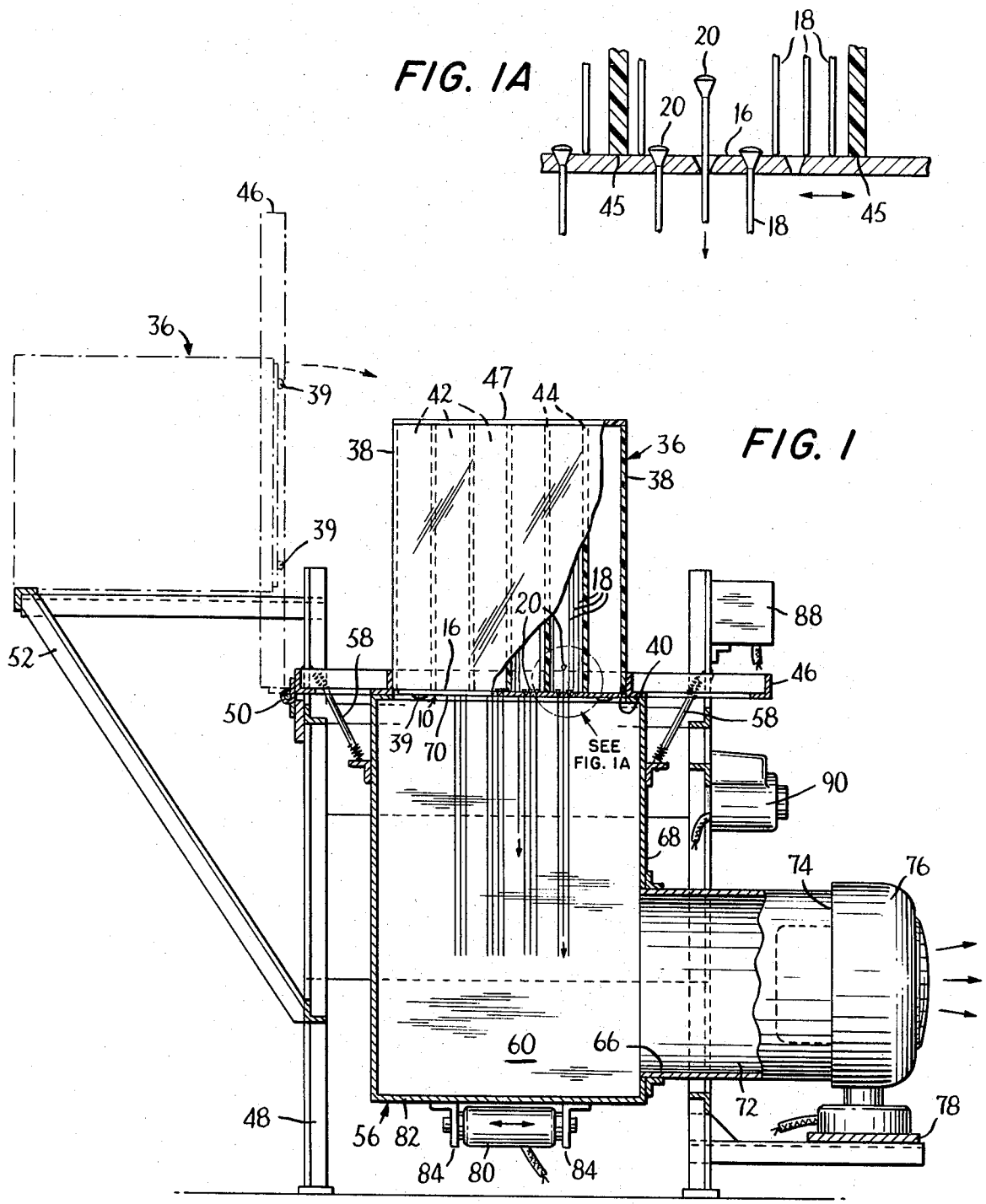
FIG. 1 is a view of an apparatus according to the invention, partly broken away.
Figure 2:
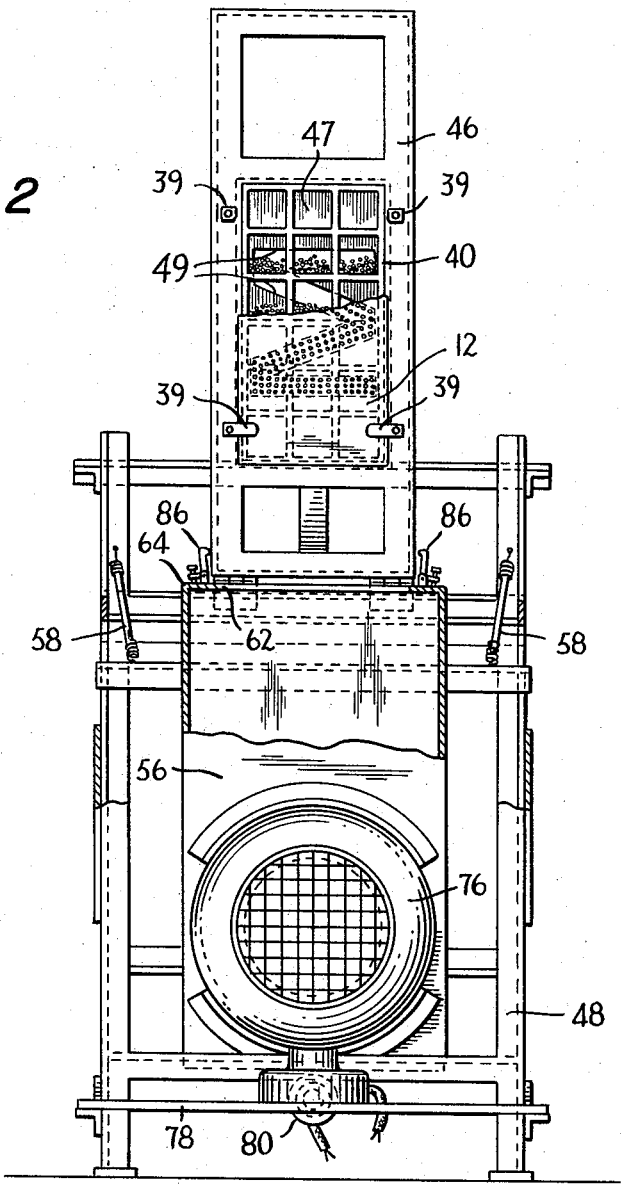
FIG. 2 is an end view of the apparatus of FIG. 1, partly in section.
Figure 3:
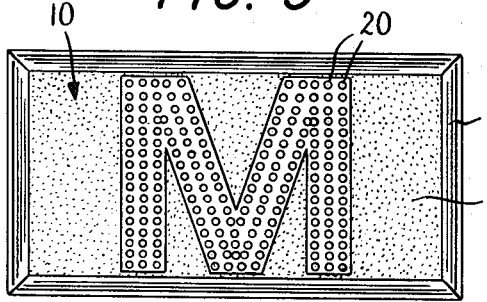
FIG. 3 is a front view of a display panel utilizing optical fibers.

FIGS. 1 and 2 illustrate an exemplary embodiment of an apparatus, according to the invention, for inserting fibers into a surface in which there are a mulitplicity of holes. Such a surface may, for example, be the front side or surface of a display panel that utilizes optical fibers, such as the one illustrated in FIGS. 3 and 4. The display panel 10 has a frame 12 and may be fabricated of any relatively lightweight and sturdy material, such as plastic or aluminum, into which holes conventiently may be drilled. Both the display panel 10 and the frame 12 are appropriately finished to present a decorative and attractive appearance. The pattern to be displayed, for example the letter "M," is marked out on the front surface 16 of the display panel 10. Holes are drilled into the display panel 10 until the M-shaped pattern is adequately defined by the holes. Optical fibers 18 are inserted into the front surface 16 of the display panel 10, each optical fiber 18 having an enlarged lens end 20 that is larger than the corresponding hole in the display panel 10. The optical fiber lens ends 20 are thus retained and displayed in the front surface 16 of the display panel 10.

Figure 4:
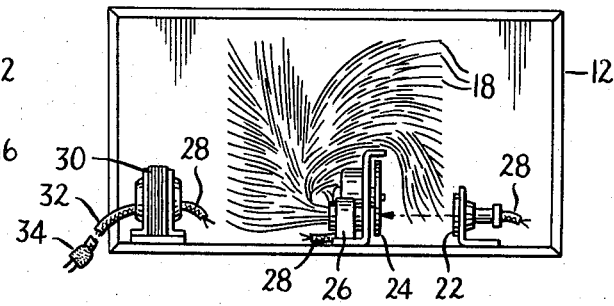
FIG. 4 is a rear view of the display panel of FIG. 3.

The optical fibers 18 extending from the underside of the front surface 16 are gathered together in a bundle, as shown in FIG. 4, and a light 22 is directed at the non-enlarged ends of the optical fibers 18. A color wheel 24 rotated by a motor 26 interposes various colored filters between the light 22 and the non-enlarged ends of the optical fibers 18 to filter the light received by the optical fibers 18 and cause the lens ends 20 of the optical fibers 18 to be illuminated in various colors. The motor 26 and the light 22 are connected by appropriate electrical conductors 28 to a transformer 30. The transformer 30 in turn is connected to an insulated electrical wire 32, which terminates in a two-prong plug 34 that may be inserted into an ordinary household outlet. Thus, when the display panel 10 is plugged in, the light 22 and the motor 26 are activated. The non-enlarged ends of the optical fibers 18 receive light waves from the light 22 and the optical fibers 18 transmit the light waves to their lens ends 20, illuminating the pattern on the front surface 16 of the display panel 10.

As shown in FIG. 1, the apparatus of the present invention includes a hopper, generally designated 36, for maintaining the optical fibers 18 in an upright position adjacent to and above the front surface 16 of the display panel 10 when the display panel 10 is placed on the apparatus with its front surface 16 in a generally horizontal position. The hopper 36 is open ended and has side walls 38 that are preferably somewhat longer than the length of the optical fibers 18. Clamps 39 associated with the hopper 36 couple the display panel 10 to the bottom of the hopper 36 so that the bottom edges 40 of the side walls 38 rest on the front surface 16 of the display panel 10. In the drawings, the entire front surface 16 of the display panel 10 covers the open end of the hopper 36, but it would be possible to insert optical fibers into only a portion of a larger display panel, for example, using the apparatus.

The hopper 36 is divided into eighteen hopper sections 42 by transverse partitions 44, the bottom edges 45 of which subdivide the display panel front surface 16 into small areas to insure even distribution of the optical fibers 18 above the front surface 16 and thus more efficient operation of the apparatus. Any lightweight material that will not mar the front surface 16 of the display panel 10 may be used to fabricate the hopper 36. A transparent plastic material is preferred, to enable the operator of the apparatus to tell quickly and conveniently whether each hopper section 42 is properly loaded with optical fibers 18.

The hopper 36 is fastened to a bracket 46 that is pivotally mounted on a supporting frame 48 by hinges 50. The bracket 46 and the supporting frame 48 are fabricated of any convenient strudy material, such as metal angles. When the hopper 36 is in a raised position, it is supported by a rest 52 that extends from the rear of the supporting frame 48 and the hopper sections 42 can be conveniently loaded with optical fibers 18 either through the top or the bottom of the hopper 36. In the illustrative embodiment, an optional template 47 having an M-shaped opening 49 is attached to the open top of the hopper 36 to insure that only the hopper sections 42 corresponding to the portions of the display panel 10 selected to receive optical fibers 18 are loaded with optical fibers. The raised position of the hopper also permits the display panel 10 to be conveniently attached to the bottom of the hopper 36 by clips 39, as shown in FIG. 2.

Although it is not essential to the inventive apparatus, a rectangular housing 56 is coupled to the supporting frame 48 below the hopper 36 by springs 58. The housing 56 defines a chamber 60 having a depth at least equal to the length of the optical fibers 18 and has an opening 62 in its upper end 64 and a second opening 66 in a vertical side 68. The opening 62 communicates with the underside 70 of the display panel 10, when the display panel 10 is adjacent the upper end 64 of the housing 56. The second opening 66 communicates with an elongated tubular hood 72 which is secured to and encloses the intake 74 of a fan 76. The joints between the hood 72 and the housing 56 and fan 76 are sealed so that when the fan 76 is switch on, it will produce downward suction in the chamber 60. The fan 76 rests on a platform 78 that extends from the front of the supporting frame 48. An electrically operated vibrator 80 is secured to the lower end 82 of the housing 56 by brackets 84.

In operation, the hopper 36 is first pivoted into its raised position so that it is supported by the rest 52. The hopper sections 42 are loaded with optical fibers 18, the lens ends 20 of the optical fibers 18 being near the top of the hopper 36. The display panel 10 is clamped to the bottom of the hopper 36 by the clips 39 with its front surface 16 contiguous with the bottom edges 40 and 45 of the hopper side walls 38 and partitions 44, respectively. The hopper is then rotated downwardly until the display panel 10 is in a generally horizontal position immediately above the opening 62 in the housing 56. The hopper 36 and the display panel 10 are then clamped to the housing 56 by clamps 86 located on the upper end 64 of the housing 56.

Thereafter, the fan 76 and the vibrator 80 are activated by switches in a switch box 88 secured to the supporting frame 48. The vibrator 80 effects relative movement between the optical fibers 18 in the hopper 36 and the display panel 10, moving the optical fibers 18 about the front surface 16 of the display panel 10. As the optical fibers 18 move about the front surface 16, they find the holes in the front surface 16 and are received in them. The activity of the vibrator 80 is controlled by a rheostat 90 mounted on the supporting frame 48. Gravity plus the suction produced by the fan 76 pulls the optical fibers 18 through the holes until the lens ends 20 of the optical fibers 18 are fully seated in the front surface 16. When all the holes in the display panel 10 are filled and the optical fibers 18 are fully seated in the holes, the fan 76 and the vibrator 80 are switched off and the clamps 86 are loosened. The hopper 36 and the display panel 10 are pivoted upwardly until the hopper 36 is supported on the rest 52. The display panel 10 is then removed from the hopper 36 and the apparatus is ready to insert optical fibers into another display panel.

It will be understood that the above-described embodiment is merely exemplary and that those skilled in the art may make many variations and modifications without departing from the spirit and scope of the invention. All such modifications and variations are intended to be within the scope of the invention as defined in the appended claims.

I claim:

1. Apparatus for inserting fibers into a surface having a multiplicity of holes therein comprising a hopper for maintaining the fibers upright adjacent to and above the surface when the surface is generally horizontal, the hopper having side walls and an open bottom end, means for effecting relative movement between the fibers and the surface to move the fibers about the surface and thereby to cause the fibers to find the holes in the surface and be received therein, and means for maintaining the surface adjacent the bottom end of the hopper while relative movement is effected between the fibers and the surface.

2. Apparatus according to claim 1, wherein the hopper also has a plurality transverse partitions dividing the hopper into a plurality of hopper sections, and the surface-maintaining means includes means mounted on the hopper for releasably coupling the surface to the bottom end of the hopper.

3. Apparatus according to claim 2, wherein the hopper is pivotally mounted on a supporting frame.

4. Apparatus according to claim 2, wherein the hopper further has an open top end.

5. Apparatus according to claim 4, further comprising a template attached to the open top end of the hopper, the template including means defining an opening therein corresponding to and aligned with a selected portion of the surface, when the surface is coupled to the bottom end of the hopper.

6. Apparatus according to claim 1, wherein the movement-effecting means includes a vibrator.

7. Apparatus according to claim 1, further comprising fan means located below the fiber-maintaining means for producing suction to pull the fibers through the holes in the surface.

8. Apparatus according to claim 7, further comprising a generally stationary supporting frame and a housing located below the fiber-maintaining means and resiliently coupled to the supporting frame, the movement effecting means being secured to the housing and the housing defining a chamber that communicates with an intake part of the fan means and is adapted to communicate with an underside of the surface through an opening in an upper end of the housing.

9. Apparatus for inserting fibers into a surface having a multiplicity of holes therein comprising a hopper for maintaining the fibers upright adjacent to and above the surface when the surface is generally horizontal, the hopper including side walls, an open bottom end and means for releasably coupling the surface to the bottom end of the hopper, a vibrator for effecting relative movement between the fibers and the surface to move the fibers about the surface and thereby to cause the fibers to find and be received in the holes in the surface, and fan means located below the hopper for producing suction to pull the fibers through the holes in the surface.

10. Apparatus according to claim 2, wherein the hopper further has an open top end and is pivotally mounted on a supporting frame.

11. Apparatus according to claim 1, wherein the hopper further has an open top end and the surface-maintaining means includes means mounted on the hopper for releasably coupling the surface to the bottom end of the hopper, and further comprising a template attached to an open end of the hopper, the template including means defining an opening therein corresponding to and aligned with a selected portion of the surface, when the surface is coupled to the bottom end of the hopper.

12. Apparatus according to claim 1, wherein each of the fibers has an enlarged end that is larger than the holes in the surface, each fiber thereby being adapted to be retained in a hole in the surface by said enlarged end.

* * * * *